United States Patent [19]

Lin

[11] Patent Number: 4,608,421
[45] Date of Patent: Aug. 26, 1986

[54] SILICONE-POLYESTER POWDER COATING COMPOSITIONS

[75] Inventor: Ju-Chui Lin, Strongsville, Ohio

[73] Assignee: SCM Corporation, New York, N.Y.

[21] Appl. No.: 745,443

[22] Filed: Jun. 17, 1985

[51] Int. Cl.⁴ ............................................. C08G 65/32
[52] U.S. Cl. .................................... 525/403; 525/446; 528/25; 528/26; 528/29
[58] Field of Search ................... 525/446, 403; 528/26, 528/29, 25

[56] References Cited

U.S. PATENT DOCUMENTS 3,912,670 10/1975 Huemmer et al. ................... 525/100
4,107,148 8/1978 Fujiyoshi et al. .................... 525/440
4,348,510 9/1982 Keck et al. ........................... 525/446

Primary Examiner—Melvyn I. Marquis
Attorney, Agent, or Firm—A. Joseph Gibbons; Thomas M. Schmitz

[57] ABSTRACT

New siloxane-polyesters, siloxane-ethers and siloxane-ether-polyesters, useful as powder coating resins, are prepared by reacting rigid diacids, neopentyl glycol, trimellitic anhydride with up to 90 percent hydroxyl functional silicone having about two =Si(R)—OH groups per molecule where R is lower alkyl or phenyl groups and the remaining silicon valences form ring-structured siloxanes. Improved powder properties, including crystallinity and tack temperatures of 50°–90° C., are believed to result in part from the rigidity provided by both the specific diacids and the cyclic silicones. The siloxane resins are hard at room temperature and can be powdered by methanical grinding. Powder coatings formulated from these resins are particularly suitable for coating metal and glass substrate.

22 Claims, No Drawings

SILICONE-POLYESTER POWDER COATING COMPOSITIONS

This invention relates to high siloxane content siloxane-polyesters, siloxane-ethers, and siloxane-ether-polyesters and their use in powder coating and coil coating formulations.

BACKGROUND OF THE INVENTION

Silicone modified solvent borne alkyd resins have been used, usually in minor proportions, for many years in exterior maintenance coatings. Hydroxy functional, low molecular weight silicones such as Z-6018 (Dow Corning) are known to react with various coating resins to form essentially block copolymers having Si—O—C linkages. Such modified resins show improved heat stability and weatherability over unmodified resins. A number of powder coatings (U.S. Pat. No. 4,107,148; Japan Kokai Nos. 73/60748 and 79/152031) comprise mixtures of a polyester and 0.1 to 5 weight percent of a silicone compound. L. M. Parr, (Fed. Soc. Coatings Technology, October 1980), used silicones and functional polymers as modifiers for alkyd resins, especially water reducible silicone alkyds. The fusion processing of Z-6018 with short, medium and long oil alkyds for improvement of air dry maintenance coatings is discussed in the Dow Coring product bulletin (1980). British Pat. No. 1,492,753 relates to a powder coating process utilizing an inorganic pigment coated with an organosiloxane-oxyalkylene copolymer as a flow additive in epoxy thermoset resins. U.S. Pat. No. 3,912,670 teaches radiation curable oils comprising the reaction products of acrylic or methacrylic acid with polyfunctional and cyclic silicones.

The present invention relates to high siloxane content silicon-polyester and silicon-polyester copolymer reins having a silicone content, basis total resin, from about 30–90% and preferably exceeding 40 percent, and which are useful in thermosetting powder coatings.

BRIEF SUMMARY OF THE INVENTION

The invention relates to high silicone content siloxane-polyester, siloxane-ether and siloxane-ether-polyester copolymers having an acid number of from about 0 to 20 an hydroxyl number from 20 to about 180 and powder coatings formulated therefrom. Briefly, such copolymer resins comprise the reaction product, totaling 100 percent of:

(a) 0 to 33 percent polyester precursor organic diacid;
(b) 20 to 30 percent multifunctional glycol or polyol having at least two hydroxy functional groups;
(c) 0 to 8 percent trimellitic acid or anhydride; and
(d) 30 to 90 percent hydroxy-functional silicone having at least two ester precursor silanol groups per mole adapted to react with said diacid and said multi-functional glycol to provide a crystalline siloxane-polyester powder coating having a tack temperature of at least 50° C.

One aspect of the invention relates to the random copolymerization of the ester precursor components with cyclic siloxanes having the structure:

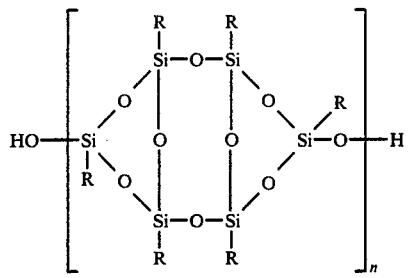

where R is independently lower alkyl or phenyl groups and n-32 1.

Further aspects include high siloxane copolymers and powder coatings comprising the condensation of 20 to 55 mole percent preformed hydroxyl bearing polyester with 45 to 80 mole percent of the above polysiloxane where n is 1 to 13.

A further aspect is the condensation of multifunctional glycols, preferably neopentyl glycol, with the cyclic siloxanes where n=1 to 12 and the formation of siloxane-polyether-polyester siloxane having at least 40 percent by weight siloxane which comprises the reaction product of 20–55 mole percent hydroxy functional polyester with 45–80 mole percent preformed glycolsiloxane adduct; wherein said glycol is selected from neopentyl glycol, bisphenol A, propylene glycol, 1,4-cyclohexane dimethanol, ethylene glycol, trimethylolethane, trimethylolpropane, p-hydroxyphenyl p-hyroxybenzoate and similar multihydroxy functional glycols. Also useful are the alkylene glycols having up to 12 carbon atoms, such as for example hexamethylene glycol.

A further aspect of the invention relates to powder coatings and paints prepared from the above copolymers.

DETAILED DESCRIPTION OF THE INVENTION

The siloxane-polyester and siloxane-polyether and siloxane-polyether-polyester copolymers are derived from the reaction of low molecular weight functional organic siloxanes, especially cyclosiloxanes, with one or more rigid dicarboxylic acids, trimellitic anhydride and multifunctional glycols with or without a chain brancher component. The siloxane copolymers exhibit high tack temperature >50° C. and good flow at high temperature. Such resins are hard and brittle at room temperature and can be powdered by mechanical grinding. Powder coatings formulated therefrom are especially valuable in coating metals.

Preferred copolymers are those wherein the diacid is terephthalic acid, the multifunctional glycol is neopentyl glycol and said hydroxy functional cyclic siloxane is a methyl and/or phenyl substituted siloxane.

Preferably siloxane component is a cyclic silanol having at least about two >SIOH groups per molecule and wherein some of the non-hydroxy valence bonds of the silanol contribute to the cyclic structure. Preferred polyfunctional silicones include those set forth in U.S. Pat. Nos. 3,912,670 and 4,107,148, both incorporated herein by reference. The most preferred hydroxy functional silicone is Z-6018 (Dow Corning) having a molecular weight of about 600 and a theoretical formula:

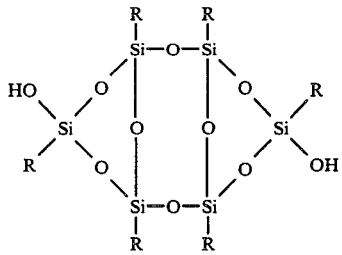

where R is independently lower alkyl or phenyl groups and particularly methyl, ethyl, and phenyl groups.

The desired crystallinity, tack temperatures and flow properties are derived from a rigid diacid, a multifunctional glycol and hydroxy-functional cyclic siloxanes. It is believed, without being bound thereto, that the advantageous properties of the instant powder coatings result in part from a controlled linearity resulting from the use of rigid diorganic acids and the inherent structure provided by the cyclic siloxanes having terminal hydroxyl group Si(R)—OH functionality and in part from the contribution of a high silicon content. The preferred siloxane is Z-6018 and self-condensation products thereof. Such products may contain up to twelve units of the above-indicated siloxane and have molecular weights of from about 600 to about 8,000.

A variety of rigid diacids are useful in the practice of this invention. These include, for example, maleic acid, fumaric acid, terephthalic acid, isophthalic acid, adipic acid, cyclohexanedicarboxylic acid, and the like. Terephthalic and isophthalic are preferred diacids because of the crystallinity and tack temperatures of the polymer resins obtained. When a mixture of different diacids is required to achieve advantageous coating properties in the formulated powder coating paints it is preferred that a major amount of terephthalic acid be used. The rigid diacids are used in amounts of from about 0–40 percent and preferably at about 25–33 weight percent.

Referring next to the polyfunctional glycols useful in preparing the silicone-polyester and siloxane-ether resins a variety of known glycols are available for use. These include, for example, ethylene glycol, propylene glycol, glycerin, bisphenol A,. bisphenol B, neopentyl glycol, pentaerythritol, trimethylolethane, trimethylolpropane glucose, 1,4-cyclohexandimethanol, polyvinyl alcohol, and the like. Neopentyl glycol is the preferred glycol and should be used in a major proportion when mixtures of other glycols are indicated for other purposes. When needed, small amounts of other alcohols, such as mono alcohols, can be added in minor proportion to provide particular coating properties. As indicated above, difunctional glycols are preferred because of the crystallinity obtained from rigid diacids and symmetrical glycols, believed to result from the linearity of such combinations. The glycols are used in amounts ranging from 15-35 and preferably from about 20 to 30 weight percent.

In addition to the above compounds, small amounts of trimellitic acid, up to 8 weight percent, are beneficial in providing backbone branching and hence contribute to rigidity and film hardness.

The resins hereinafter exemplified are hard and brittle at room temperature and can be powdered by mechanical grinding. Unless otherwise indicated temperatures are expressed in degrees Centrigrade and percentages are weight percentages.

EXAMPLE 1

Preparation of Silicone-Polyester

A composition comprising silicone resin Z-6018 (Dow Corning) 37.4 pphr, mixed with 29.5 pphr or neopentyl glycol (NPG), 33.2 pphr of terephthalic acid and 300 ppm of butyl stannoioc acid was heated in a resin kettle with vigorous stirring and nitrogen gas purging for 24 hours at temperature below 260° C. until a clear resin was obtained. Acid number 17.3; OH% 2.5; tack temperature of the powder made from this resin is 70° C.; melt viscosity in 20 poise 200° C. and 55 poise 175° C.; % silicone: 40; GPC $\overline{MW}$ 1.44×10$^5$.

EXAMPLE 2

Preparation of Siloxane-Polyether

Resin 2-A

In one resin kettle, 80 pphr of Z-6018 was cooked with 20 pphr of neopentyl glycol; within 6 hours it was heated up to 235° C. and a clear transparent resin was obtained; tack temperature 57° C.; melt viscosity 10 poise 200° C.; % silicone 79.

Resin 2B

In a separate resin kettle, 40 pphr neopentyl glycol was melted and 53.3 pphr of terephthalic acid added. The mix was cooked for 2 days at a temperature below 260° C. until it turned transparent. Then a 6.6 pphr of trimellitic anhydride were added and cooked to obtain a final acid number of 42; tack temperature 83° C.; and melt viscosity 20 poise at 200° C.

Siloxane-polyether-polyester

Resin 2-C Equal amounts of resin 2-A and resin 2-B were cooked to final acid number of 18.84 at temperature not exceeding 230° C. for an hour. Product resin had a tack temperature at 90° C.; melt viscosity of 50 poise at 200° C.; % silicone 40.

EXAMPLE 3

Resin 2-A (63%) and resin 2-B (37%) were combined and cooked at about 220° C. for 30 minutes. The product was a clear transparent resin: acid number 15; tack temperature 87° C.; melt viscosity 20 poise at 200° C.; % silicone 50; GPC / 1.28×10$^4$.

EXAMPLE 4

Two-Stage Preparation of Siloxane-Ether

Resin 4-A

In a 5-liter 4-neck round bottom flask, 70.8 parts Z-6018 were added with 29.2 parts neopentyl glycol. The mixture was cooked for 7 hours below 190° C. until a clear resin was obtained. Tack temperature of the powder made from this resin is 50° C. melt viscosity at 200° C. is 5 poise. GPC :/ 2330; % silicone 71.

Resin 4-B

In a separate 5-liter 4-4-neck round bottom flask, 40 parts of resin 2-B (straight polyester) and 60 parts of resin 4-A were cooked to final acid number of 15.6. Product resin has a tack temperature at 64° C., melt viscosity of 8 poise at 200° C.; % silicone 44.2; GPC $\overline{MW}$ 7910.

Resin 4-B, 100 pphr

Caprolactam blocked isophorone diisocyanate, (blocked IPDI crosslinker) 63 pphr; titanium dioxide 133.5 pphr, and Resiflow P (SBS Chemicals), 2.1 pphr were blended, extruded, grinded, and shivered to less than 100 mesh. The white powder was coated over bonderite 1000 cold rolled steel (Baker Chemicals Company) and then baked at 200° C. for 20 minutes. The resulting coating is 2.4 to 4.0 mils thick; with 3H pencil hardness, 40 lb-in. direct impact. 100 double MEK rubs passed; 86% 60 degree spatial gloss, 49% 20-degree gloss, and 94% 85 degree gloss, initially; after 630 hours QUV exposure: 51% 60degree gloss, 8% 20 degree gloss and 92% 85 degree gloss.

EXAMPLE 5

High Gloss Powder Coating

One-Step Cook Using Isophthalic Acid

In a 5-liter 4-neck round bottom flask, 27.5 parts of neopentyl glycol, 23 parts of isophthalic acid were mixed and heated below 240° C. with stiring and nitrogen purging. Silicone intermediate Z-6018, 49.5 parts were added in fractions during the 4-days cook. The resin turns clear during the first day of reaction; at the end of cooking, 318 gms. of water was collected. The resulting resin has a tack temperature of 57.3° C; melt viscosity 10 poises at 175° C.; acid number 7.8; and % silicone 47 and GPC / is 6210.

This resin, 100 pphr, was blended with Blocked IPDI crosslinker, 48 pphr; titanium dioxide 121 pphr and Resilfow P, 1.9 pphr by extrusion. The powder was sprayed on Bonderite 1000 and baked 30 minutes at 200° C. to give a coating of 1.6 to 2.2 mils thick. The coating passed 100 MEK double rubs; H pencil hardness; 35 lb-in. direct impact, and 88% on 60-degree gloss, 74% on 20-degree gloss and 98% on 85 degree gloss, initial readings; after 630 hours QUV exposure: 82% 60 degree gloss, 50% 20 degree gloss and 99% 85 degree gloss.

EXAMPLE 6

Low Gloss Powder Coating

One-Step Silicone-Ether/Polyester Blend

In a 5-liter 4-neck round bottom flask, 87.2 parts of Z-6018 were heated to less than 210° C. for 2 hours, 33 ml. of water were collected. Then the temperature was lowered to 170° C. and 12.8 parts of neopentyl glycol were added slowly. The mixture was cooked below 220° C. for another 2.5 hours until 74 ml. of water was collected. The resin tack temperature if 80° C., melt viscosity at 200° C. is 18 poises, % silicone 88.3, and GPC / is 5690.

The resin, 56.8 pphr and 43.2 pphr commercial polyester (Goodyear VPE5802; acid number 15) was blended with blocked IPDI crosslinker, 29 pphr; Resiflow P, 1.65 pphr and titanium dioxide 105.5 pphr by extrusion. The powder was sprayed on Bonderite 1000 and baked at 200° C. for 20 minutes to give a coating of 2.4 to 4.0 mils thick. The film passed 100 MEK double rubs; 3H pencil hardness; 140 lb-in. direct and reverse impact; 45% on 60-degree gloss; 8.7% on 20-degree gloss and 55% on 85-degree gloss, initial readings; after 630 hours QUV exposure: 38.4% 60 degree gloss, 5.7% 20 degree gloss and 54% 85 degree gloss.

EXAMPLE 7

Low Gloss Powder Coating

The resin of Example 6 (100 pphr) was blended and extruded with 27 pphr blocked IPDI crosslinker, 0.9 pphr of Resiflow P and 104.7 pphr titanium dioxide. The powder was sprayed on Bonderite 100 CRS and baked at 200° C. for 20 minutes and 180° C. for another 19 hours: 25 lb-inch direct impact, 6.2% 60 degree gloss, 1% 20 degree gloss and 93% 85 degree gloss.

EXAMPLE 8

Terephthalic acid, 21.9 parts; neopentyl glycol 30 parts, and 125 ppm of butyl stannoic acid were heated to less than 210° C. for 7.5 hrs. and kept at 160° C. overnight, then heated to less than 250° C. for 6.5 hrs. about 550 ml of water was collected. Then 0.47 part of TMA was added, and the reaction was continued at around 230° C. for 1.5 hrs. and cooled to 160° C. for overnight. Then 47.62 parts of Z-6018 were added slowly in several fractions below 220° C. until approximately 760 ml. of water were collected. The resin has the following properties: acid number 11.5; tack temperature 52.5; melt viscosity 4 poises (175° C.), GPC $\overline{MW}$ 2960.

100 pphr of the resin was blended and extruded with 48 pphr of blocked IPDI crosslinker, 1.9 pphr Resiflow and 121 pphr titanium dioxide. The powder was sprayed on Bonderite 1000 CRS and baked at 200° C. for 20 minutes and 180° C. for another 19 hours. 100 MEK rubs, 15 lb-inch direct impact; 84% 60 degree gloss, 46.5% 20 degree gloss and 92% 85 degree gloss.

EXAMPLE 9

In a 5-liter 4-neck round bottom flask, 73.2 parts of Z-6018 were heated to below 220° C. for 2 hrs. until 29 ml. of water were collected. Then 6 parts of isophthalic acid were added and 20.8 parts of neopentyl glycol were added in fractions within 24 hours. The batch was controlled under 230° C. with nitrogen purging and stirring until an acid number of 12 was reached. The resin is clear, has a tack temperature of 74° C. and melt viscosity is 40 poises at 200° C.; silicone 73. GPC $\overline{MW}$ 34,500.

EXAMPLE 10-12

Example 10 shows a siloxane-ether using bisphenol A as the multifunctional hydroxyl component (i.e. glycol) and a minor amount of diacid (IPA). Example 11 is a variant of Example 2-A--a siliconether with acid number and n=1. Example 12 is a variant of Example 6, a siloxane-ether where the siloxane is a condensed siloxane unit and n is greater than 2.

TABLE I

| EXAMPLE NO. | 1 | 2-A | 2-B | 3 | 10 | 11 |
| --- | --- | --- | --- | --- | --- | --- |
| mole Si—OH | 1.1 | 1.9 | 0 | 170 g Resin 2-A | 2.0 | 8.0 |
| mole C—OH | 4.2 | 2.4 | 18 | — | 2.8 | 16.0 |
| mole COOH | 3.0 | 0 | 16.9 | 100 g Resin 2-B | 0.6 | 0 |
| C—OH type | NPG | NPG | NPG | NPG; PG; TME | BPA | NPG |
| COOH type | TPA | — | TPA; TMA | TPA | IPA | — |
| acid number | 17.3 | 22 | 49 | 15 | — | 0 |

TABLE I-continued

| EXAMPLE NO. | 1 | 2-A | 2-B | 3 | 10 | 11 |
|---|---|---|---|---|---|---|
| Hydroxyl Number | 83 | 53 | 66 | 53 | — | 155 |
| $\frac{\text{COOH} + \text{SiOH}}{\text{COH}}$ | 0.97 | 0.78 | 0.94 | 0.84 | 0.93 | 0.5 |
| $\overline{Mn}$ | 2310 | 1780 | 2360 | 2240 | — | 900 |
| $\overline{Mw}$ | 144000 | 7310 | 5780 | 12800 | — | 2330 |
| $\overline{Mw}/\overline{Mn}$ | 62.5 | 4.10 | 2.45 | 5.72 | — | 2.59 |
| Tack Temp. (°C.) | 70.2 | 56.7 | 82.8 | 87.3 | 82.1 | 50.0 |
| ICI C & P Viscosity (Poise)* | 20 | 10 | 20 | 20 | 30 | 5 |
| Silicone % (Wt.) | 40 | 79 | 0 | 50 | 60 | 71 |
| Comment | BSA Catalyzed | — | BSA Catalyzed | — | — | *** |

NPG: neopentyl glycol; TMA: trimellitic anhydride; TPA: terephthalic acid; IPA: isophthalic acid; BPA: bisphenol A; PG: propylene glycol; TME: trimethylolethane; BSA: butyl stannoic acid.
*Copolymerizing 1 kg polyester 2-B with 1.5 kg resin
**Measured at 175° C.
***Extruded with VPE 5802

TABLE II

| EXAMPLE NO. | 4 | 5 | 6,7 | 8 | 9 | 12 |
|---|---|---|---|---|---|---|
| mole Si—OH | * | 7.2 | 8 | 15 | 8 | 8 |
| mole C—OH | * | 20.2 | 6 | 48.5 | 11 | 12 |
| mole COOH | * | 10.6 | 0 | 28.8 | 2 | 0 |
| C—OH type | NPG | NPG | NPG | NPG | NPG | NPG |
| COOH type | TPA; TMA | IPA | — | TPA; TMA | IPA; TMA | — |
| acid number | 15.7 | 7.8 | 0 | 11.5 | 12 | 0 |
| Hydroxyl Number | 116 | 90 | 73 | 90 | 50 | 50 |
| $\frac{\text{COOH} + \text{SiOH}}{\text{COH}}$ | 0.67 | 0.88 | 1.33 | 0.90 | 0.91 | 0.67 |
| $\overline{Mn}$ | 833 | 623 | 1540 | 554 | 5530 | 1250 |
| $\overline{Mw}$ | 7910 | 6214 | 5690 | 2960 | 34500 | 8910 |
| $\overline{Mw}/\overline{Mn}$ | 9.49 | 9.98 | 3.70 | 5.35 | 62.5 | 7.14 |
| Tack Temp. (°C.) | 64 | 57.3 | 80 | 52.5 | 74 | 59.3 |
| ICI C & P Viscosity (Poise)** | 12 | 10 | 40 | 4 | 40 | 31.5 |
| Silicone % (Wt.) | 44.2 | 47.3 | 88.3 | 47.3 | 73 | 77 |

NPG: neopentyl glycol; CHDM: cyclohexanedimethanol; TMA: trimellitic anhydride; TPA: terephthalic acid; IPA: isophthalic acid.
BPA: bisphenol A; PG: propylene glycol; TME: trimethylolethane; BSA: butyl stannoic acid.
**Measured at 200° C.

What is claimed is:

1. A siloxane-polyester, siloxane ether or siloxane-ether-polyester copolymer resin having an acid number of from about 0 to 20, a hydroxyl number from about 20 to about 180 and comprising the reaction product, totaling 100 percent of:
   (a) 0 to 33 percent polyester precursor rigid organic diacid;
   (d) 20 to 30 percent multifunctional glycol or polyol having at least two hydroxy functional groups;
   (c) 0 to 8 percent trimellitic acid or anhydride; and
   (d) 30 to 90 percent hydroxy-functional cyclic siloxane having at least two silanol groups per mole adapted to react with said multifunctional glycol and acid to provide a crystalline siloxane-polyester or siloxane-ether powder coating resin having a tack temperature of at least 50° C.;
said siloxane having the structure:

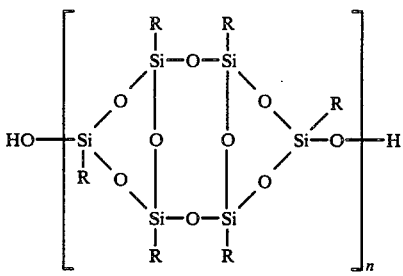

where n is an integer from 1 to 10 and R independently represents lower alkyl and phenyl groups.

2. The copolymer resin of claim 1 wherein the copolymer resin is a siloxane-polyester derived from the reaction of one or more precursor diacids, one or more multifunctional glycols, and said siloxane wherein said reactants are selected to impart a rigid resin chain and to provide a crystalline resin having a tack temperature of 60° to 90° C.; wherein the multifunctional glycol is selected from the group consisting of neopentyl glycol, bisphenol A, propylene glycol, 1,4-cyclohexanedimethanol, ethylene glycol, trimethylolethane, trimethylol propane; and p-hydroxyphenyl ester of p-hydroxybenzoic acid.

3. The composition of claim 2 wherein the diacid is terephthalic acid, isophthalic acid or mixtures thereof, the glycol is at least 60 percent neopentyl glycol; the R groups in the siloxane are methyl and phenyl groups and n=1.

4. The composition of claim 3 wherein said siloxane has a molecular weight of from about 600 to 8,000 and comprises at least 50 weight percent of said copolymer resin.

5. A powder coating comprising the siloxane-polyester of claim 4.

6. A metal substrate coated with the powder coating of claim 5.

7. A siloxane-polyester composition having an acid number of from about 0 to about 20, a hydroxyl number from about 20 to about 180 and a siloxane content of at least 40 percent by weight which comprises the reaction (a) 20 to 55 mole percent hydroxyl functional preformed polyester; and (b) 45–80 mole percent of a siloxane-glycol adduct being the reaction product of the siloxane of claim 1 with a multifunctional glycol selected from the group consisting of neopentyl glycol, bisphenol A, propylene glycol, 1,4-cyclohexanedimethanol, ethylene glycol, trimethylolethane, and trimethylol propane, and p-hydroxyphenyl p-hydroxybenzoate.

8. The siloxane-polyester composition of claim 7 wherein the preformed polyester is derived from the condensation of neopentyl glycol, isophthalic acid, and trimellitic anhydride and the siloxane-glycol adduct is the reaction product of a siloxane where n=1 to 4 with neopentyl glycol.

9. A powder coating composition having as resin binder the siloxane-polyester of claim 8.

10. A powder coating composition having as resin binder the siloxane-polyester of claim 7.

11. A powder coating composition having a resin binder having an acid number of from about 0 to 20, a hydroxyl number from about 20 to 180 and comprising 40 to 60 percent preformed polyester; 60 to 40 percent siloxane-ether derived from the reaction of the siloxane of claim 1 wherein n=1 with up to 40 mole percent multifunctional glycol selected from the group consisting of neopentyl glycol, bisphenol A, propylene glycol, 1,4-cyclohexanedimethanol, ethylene glcyol, trimethylolethane, trimethylol propane, and p-hydroxyphenyl p-hydroxybenzoate.

12. A block siloxane-polyester copolymer of claim 1 comprising the reaction product of
20 to 55 mole percent hydroxyfunctional preformed polyester with 45 to 80 mole percent cyclic-siloxane of claim 1 where n=1 and the glycol or polyol is neopentyl glycol, bisphenol A, propylene glycol, 1,4-cyclohexandimethanol, ethylene glycol, butylene glycol, trimethylolethane, trimethylol propane and hydroxyphenyl esters of hydroxy benzoic acid.

13. A powder coating comprising the siloxane-polyester copolymer resin of claim 12.

14. The high siloxane content copolymer resin of claim 1 comprising a siloxane-ether derived from the condensation of from about 90 to 70 mole percent cyclic siloxane, where n is an integer from 1 to 10, with about 10 to 30 mole percent of a multifunctional glycol or polyol.

15. The copolymer of claim 14 wherein n is 2 to 6 and the glycol or polyol is neopentyl glycol, bisphenol A, propylene glycol, 1,4-cyclohexane dimethanol, ethylene glycol, butylene glycol, hexamethylene glycol, trimethylolethane, trimethylpropane, p-hydroxyphenyl p-hydroxybenzoate or mixtures thereof.

16. A powder coating comprising the copolymer of claim 15.

17. The composition of claim 15 wherein the glycol is neopentyl glycol.

18. A block siloxane-polyester copolymer having an acid number from 0 to 20, a hydroxyl number from 20 to about 180 and comprising the reaction product of
(a) 20 to 55 mole percent hydroxyl functional preformed polyester; with
(b) 45 to 80 mole percent of the siloxane ether of claim 14.

19. A powder coating comprising the block siloxane-polyester copolymer of claim 18 wherein the ester comprises the reaction product of isophthalic acid, neopentyl glycol and siloxane-ether is a neopentyl glycol siloxane-ether.

20. A powder coating comprising the siloxane-ether of claim 17.

21. A powder coating comprising the siloxane-ether of claim 18.

22. The copolymer resin of claim 2 wherein the siloxane-polyester reactants additionally include trimellitic acid or trimellitic anhydride.

* * * * *